United States Patent
Hull et al.

(10) Patent No.: US 10,647,081 B2
(45) Date of Patent: May 12, 2020

(54) LIGHTWEIGHT HONEYCOMB THERMAL INSULATION STRUCTURE

(71) Applicant: The Boeing Company, Chicago, IL (US)

(72) Inventors: John R. Hull, Sammamish, WA (US); Cameron Kai-Ming Chen, Seattle, WA (US); John Dalton Williams, Decatur, AL (US)

(73) Assignee: The Boeing Company, Chicago, IL (US)

( * ) Notice: Subject to any disclaimer, the term of this patent is extended or adjusted under 35 U.S.C. 154(b) by 186 days.

(21) Appl. No.: 15/476,188

(22) Filed: Mar. 31, 2017

(65) Prior Publication Data

US 2018/0281339 A1    Oct. 4, 2018

(51) Int. Cl.
| | |
|---|---|
| *B32B 3/12* | (2006.01) |
| *B32B 27/34* | (2006.01) |
| *B33Y 10/00* | (2015.01) |
| *B32B 3/26* | (2006.01) |
| *B32B 37/14* | (2006.01) |
| *B32B 38/00* | (2006.01) |
| *B32B 38/04* | (2006.01) |

(52) U.S. Cl.
CPC ............ *B32B 3/12* (2013.01); *B32B 3/266* (2013.01); *B32B 27/34* (2013.01); *B33Y 10/00* (2014.12); *B32B 37/146* (2013.01); *B32B 38/0008* (2013.01); *B32B 2038/047* (2013.01); *B32B 2307/304* (2013.01)

(58) Field of Classification Search
None
See application file for complete search history.

(56) References Cited

U.S. PATENT DOCUMENTS

2014/0287641 A1* 9/2014 Steiner, III .......... B32B 5/26
442/223
2015/0165736 A1* 6/2015 Sattayatam .......... B32B 3/12
428/117

OTHER PUBLICATIONS

Kumar et al., Convective effects in air layers bound by cellular honeycomb arrays, 2005, Journal of Scientific and Industrial Research, vol. 64, pp. 602-612. (Year: 2005).*
K. G. T. Hollands "Natural Convection in Horizontal Thin-Walled Honeycomb Panels", Journal of Heat Transfer, Copyright 1973 by ASME, Nov. 1973 Downloaded from: http://heattransfer.asmedigitalcollection.asme.org/.
Warren M. Rohsenow "Handbook of Heat Transfer", McGraw-Hill.

* cited by examiner

*Primary Examiner* — David Sample
*Assistant Examiner* — Elizabeth Collister
(74) *Attorney, Agent, or Firm* — Miller, Matthias & Hull LLP

(57) ABSTRACT

A honeycomb thermal insulation structure may comprise a first facesheet, a second facesheet, and a honeycomb core between the first facesheet and the second facesheet. The honeycomb core may include a plurality of honeycomb unit cells each composed of walls having a height and spaced by a distance. The walls of the honeycomb cells may have perforations. The honeycomb thermal insulation structure may further comprise a non-convective gas loaded in the honeycomb unit cells between the walls. A flow of the gas through the perforations may be substantially absent.

20 Claims, 6 Drawing Sheets

LIGHTWEIGHT HONEYCOMB THERMAL INSULATION STRUCTURE

This invention was made with Government support under contract number NNC15AA01A awarded by NASA. The government has certain rights in this invention.

FIELD

The present disclosure generally relates to thermal insulation structures and, more specifically, to lightweight honeycomb thermal insulation structures and to methods of fabricating such structures.

BACKGROUND

Many applications require thermal insulation. However, many existing thermal insulation materials may not be sufficiently lightweight for aerospace applications.

SUMMARY

In accordance with one aspect of the present disclosure, a honeycomb thermal insulation structure is disclosed. The honeycomb thermal insulation structure may comprise a first facesheet, a second facesheet, and a honeycomb core between the first facesheet and the second facesheet. The honeycomb core may include a plurality of honeycomb unit cells each composed of walls having a height and spaced by a distance. The walls of the honeycomb unit cells may have a plurality of perforations. The honeycomb thermal insulation structure may further comprise a non-convective gas loaded in the honeycomb unit cells between the walls. A flow of the gas through the perforations may be substantially absent.

In accordance with another aspect of the present disclosure, a honeycomb thermal insulation structure for a cryogenically cooled component is disclosed. The honeycomb thermal insulation structure may comprise a plurality of facesheets, and at least one honeycomb core disposed between the plurality of facesheets. The honeycomb core may include a plurality of pairs of rods extending through a height of the honeycomb core and penetrating the facesheets. The honeycomb core may further include a plurality of honeycomb unit cells having walls joined at corners and formed by a thin film threaded between the pairs of rods. The pairs of rods may each be located at one of the corners. The honeycomb thermal insulation structure may further comprise a gas loaded in the honeycomb unit cells between the walls. A height of the walls and a distance between the walls of the honeycomb unit cells may be selected so that heat transfer through the gas by convection is substantially absent.

In accordance with another aspect of the present disclosure, a method of fabricating a honeycomb thermal insulation structure is disclosed. The method may comprise fabricating a honeycomb core having a plurality of honeycomb unit cells formed from walls, installing perforations in the walls of the honeycomb unit cells, and bonding the honeycomb core to a plurality of facesheets. The method may further comprise loading the honeycomb unit cells with a gas. A flow of the gas through the perforations to neighboring unit cells may be substantially absent.

The features, functions, and advantages that have been discussed can be achieved independently in various embodiments or may be combined in yet other embodiments further details of which can be seen with reference to the following description and drawings.

It should be understood that the drawings are not necessarily drawn to scale and that the disclosed embodiments are sometimes illustrated schematically. It is to be further appreciated that the following detailed description is merely exemplary in nature and is not intended to limit the invention or the application and uses thereof. Hence, although the present disclosure is, for convenience of explanation, depicted and described as certain illustrative embodiments, it will be appreciated that it can be implemented in various other types of embodiments and in various other systems and environments.

DETAILED DESCRIPTION

Figure 1:
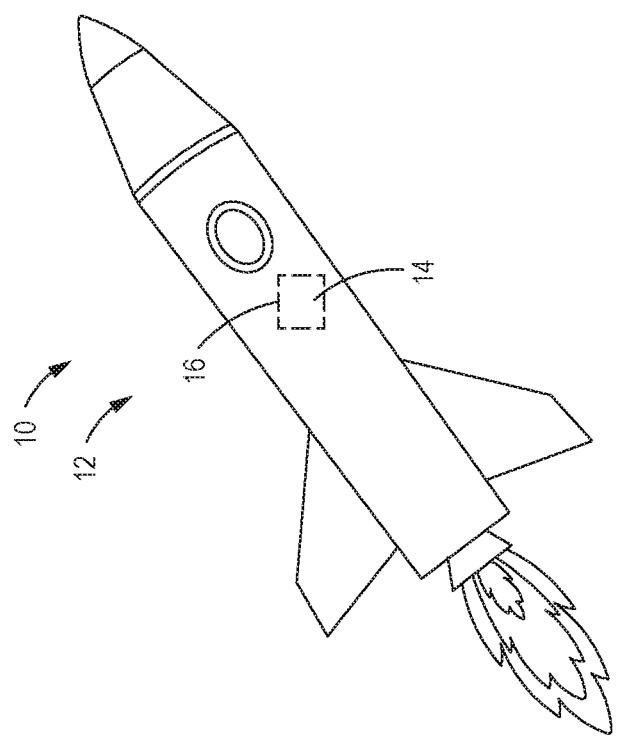
FIG. 1 is a side view of an aerospace vehicle having a honeycomb thermal insulation structure, constructed in accordance with the present disclosure.

Referring now to the drawings, and with specific reference to FIG. 1, an aerospace vehicle 10 is shown. The aerospace vehicle 10 is a vehicle that experiences variable altitude during operation such as a spacecraft 12 or an aircraft. As non-limiting examples, the aerospace vehicle 10 may be a rocket, satellite, spaceplane, space probe, airplane, helicopter, drone, or missile. The aerospace vehicle 10 includes one or more cryogenically cooled components 14 configured with one or more honeycomb thermal insulation structures 16 (also see FIG. 2) that protect the component 14 from temperature fluctuations. For example, the component 14 may be a cryogenically cooled tank or a cryogenically cooled electronic device. As used herein, a "cryogenically cooled" component is a component cooled with a cryogen that is at a temperature below about −160° C. The honeycomb thermal insulation structure 16 prevents evaporation of the cryogen and resulting pressure accumulation in the aerospace vehicle 10. In other embodiments, the thermal insulation structure 16 may be used for insulation of non-cryogenically cooled components.

Figure 2:
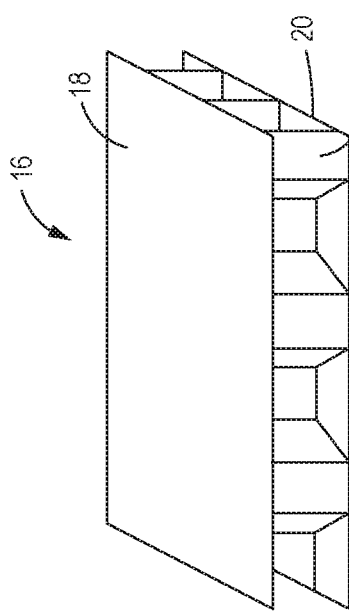
FIG. 2 is a perspective view of the honeycomb thermal insulation structure shown in isolation, constructed in accordance with the present disclosure.
Figure 3:
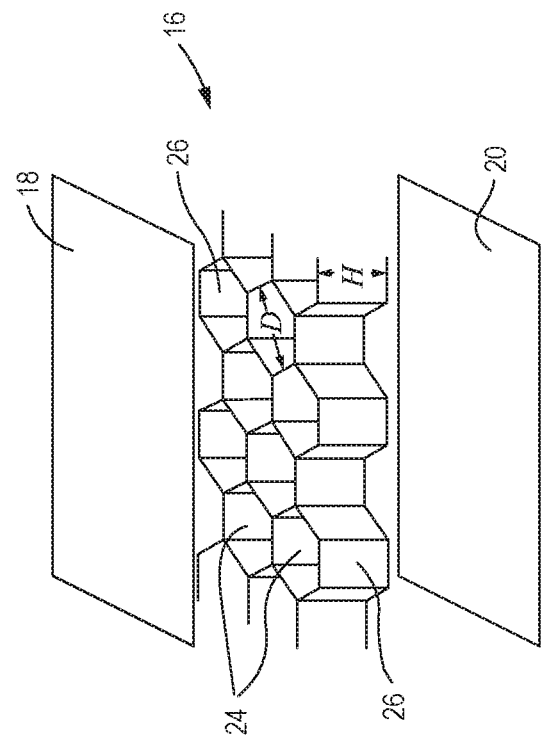
FIG. 3 is an exploded view of the honeycomb thermal insulation structure of FIG. 2, illustrating a honeycomb core, constructed in accordance with the present disclosure.

Turning to FIGS. 2-3, the honeycomb thermal insulation structure 16 is a sandwich composite structure that includes a first facesheet 18, a second facesheet 20, and a honeycomb core 22 between the first and second facesheets 18 and 20. The honeycomb core 22 consists of a plurality of interconnecting honeycomb unit cells 24 each formed from adjoining walls 26 (see FIG. 3). Although the honeycomb unit cells 24 of FIGS. 2-3 have a hexagonal cross-sectional geometrical shape, in other embodiments, the unit cells 24 may have other cross-sectional geometrical shapes such as, but not limited to, octagonal, heptagonal, hexagonal, pentagonal, rectangular (including rhombus shapes), and triangular. The walls 26 of the honeycomb core 22 are sufficiently thin so that heat conduction along the walls 26 is minimal or negligible. In one arrangement, the walls 26 have a thickness (T) ranging from about 30 microns to about 150 microns (e.g., about 100 microns) depending on how the walls 26 are fabricated. The walls 26 are formed from a material with low thermal conductivity such as, but not limited to, extruded plastic, polymeric materials, ceramic, composite materials, or an aerogel. In some cases, the walls 26 may be at least partially formed from a metallic material if the walls 26 are made sufficiently thin enough to minimize heat conduction along the metallic material.

Loaded in the unit cells 24 between the walls 26 is a non-convective gas. To minimize condensation of oxygen or water in the structure 16, the gas is a dry gas such as nitrogen, argon, helium, neon, and/or hydrogen, although the gas may be air in some circumstances as well. As will be appreciated by those skilled in the art, the height (H) of the walls 26 and the distance (D) between the walls 26 is chosen so that sufficient friction exists between the walls 26 and the gas to substantially or entirely suppress heat transfer through the gas by convection. That is, the height (H) of the walls 26 and the distance (D) between the walls 26 at least partially defines the critical Rayleigh number of the gas at which convection occurs, and the height (H) and the distance (D) is selected so that the Rayleigh number of the gas remains below the critical Rayleigh number under the operating conditions of the structure 16. As the gas has a substantially lower thermal conductivity than solids, and occupies a much greater cross-sectional area than the walls 26, the non-convective gas is the primary insulating element of the structure 16. Although the walls 26 have a higher thermal conductivity than the gas, heat transfer along the walls is minimal or negligible due to the thinness of the walls 26.

Figure 4:
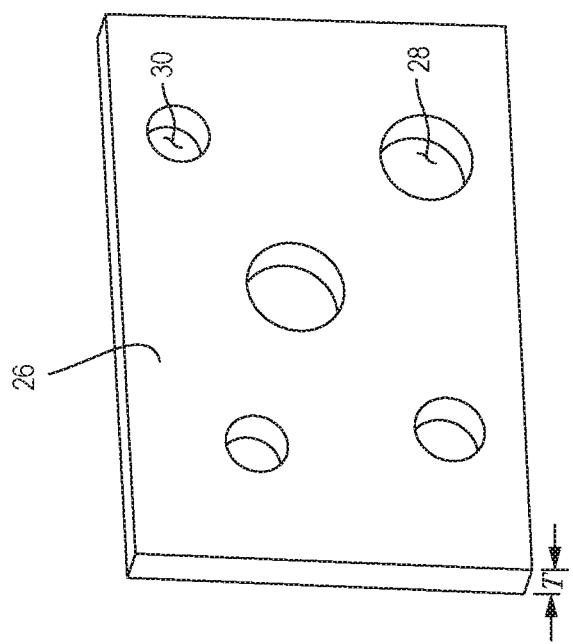
FIG. 4 is a perspective view of a perforated wall of the honeycomb core shown in isolation, constructed in accordance with the present disclosure.

Turning to FIG. 4, the walls 26 of the unit cells 24 have a plurality of perforations 28 that provide the walls 26 with a porosity and substantially reduce the weight of the structure 16. To prevent gas convection, the porosity of the walls 26 is chosen so that the friction between the gas and the perforated walls 26 approximates or is substantially equivalent to the friction between the gas and identical, but non-perforated walls having the same height and separated by the same distance. Accordingly, installation of the perforations 28 in the walls 26 does not substantially impact the critical Rayleigh number of the gas as defined by the height (H) of the walls and the distance (D) between the walls 26. The perforations 28 may have variable or uniform sizes, and may be randomly distributed or uniformly distributed in a regular, repeating pattern on the walls 26. Furthermore, the perforations 28 may have various shapes such as, but not limited to, circular (see FIGS. 4-6), oval, polygonal (see FIG. 7), and/or amorphous shapes.

The porosity of the walls 26 is limited to maintain the mechanical strength of the walls 26 and a desired degree of friction between the walls 26 and the gas. Moreover, the porosity of the walls 26 is selected so that a flow of the gas through the perforations 28 to neighboring unit cells 24 is substantially absent. The latter feature is beneficial for variable-altitude applications, as it prevents the unit cells 24 from equilibrating in pressure with ambient pressures as the ambient pressures vary. In some embodiments, the walls 26 have a porosity ranging from about 1% to about 50%, although the porosity may be greater than 50% in some designs (see further details below). As explained in further detail below, the perforations 28 are formed by generating the perforations 28 in solid walls (e.g., by machining, laser treatment, radiation exposure, three-dimensional printing, etc.). Alternatively, if the walls 26 are formed from an aerogel, the perforations 28 have nanometer (nm) dimensions (e.g., <100 nm, or <50 nm) and are formed by the pre-existing pores of the aerogel.

Figure 5:
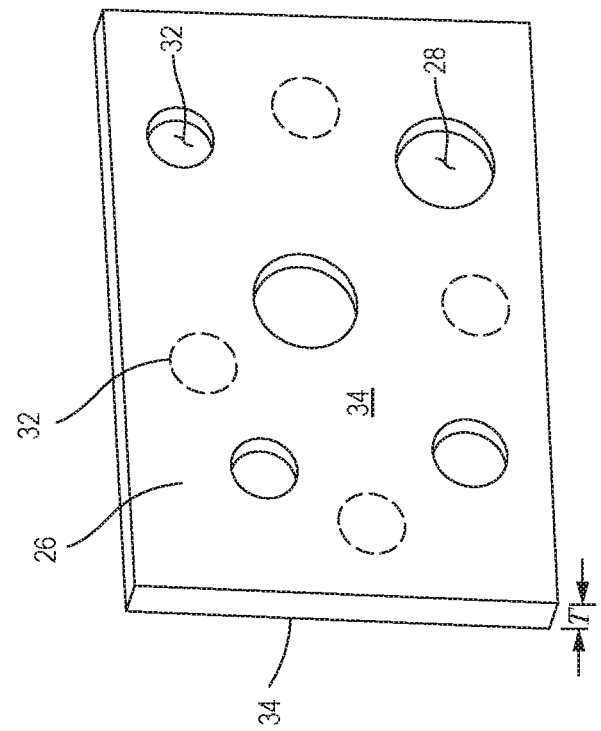
FIG. 5 is a perspective view of a wall similar to FIG. 4, but having partial perforations, constructed in accordance with the present disclosure.

In some arrangements, the perforations 28 are complete perforations 30 that extend entirely through a thickness (T) of the walls 26 and fully puncture the walls 26, as shown in FIG. 4. In other arrangements, the perforations 28 are partial perforations 32 that extend partially through the thickness (T) of the walls 26, as shown in FIG. 5. In other embodiments, the walls 26 have a mixture of complete perforations 30 and partial perforations 32. The partial perforations 32 are presented on one or both sides 34 of the walls 26 (see partial perforations 32 in phantom in FIG. 5). If the partial perforations 32 are presented on both sides 34 of the walls 26, the partial perforations 32 on one of the sides 34 do not overlap or coincide with the partial perforations 32 on the opposing side 34 to prevent the perforations from extending completely through the walls 26. With the partial perforations 32, nearly the same amount of wall material is removed from the walls 26 as the complete perforations 30 to provide a comparable amount of weight reduction. However, with the partial perforations 32, the walls 26 remain solid so that the friction between the gas and the walls 26 is the same or substantially the same as the friction between the gas and identical non-perforated walls having the same height and spacing. The partial perforations 32 extend at least halfway (e.g., about 50%) through the thickness (T) of the walls 26. For example, in some arrangements, the partial perforations 32 extend between about 70% and about 90% through the thickness (T) of the walls 26. However, in some cases, the partial perforations 32 may extend less than halfway through the walls 26.

Figure 7:
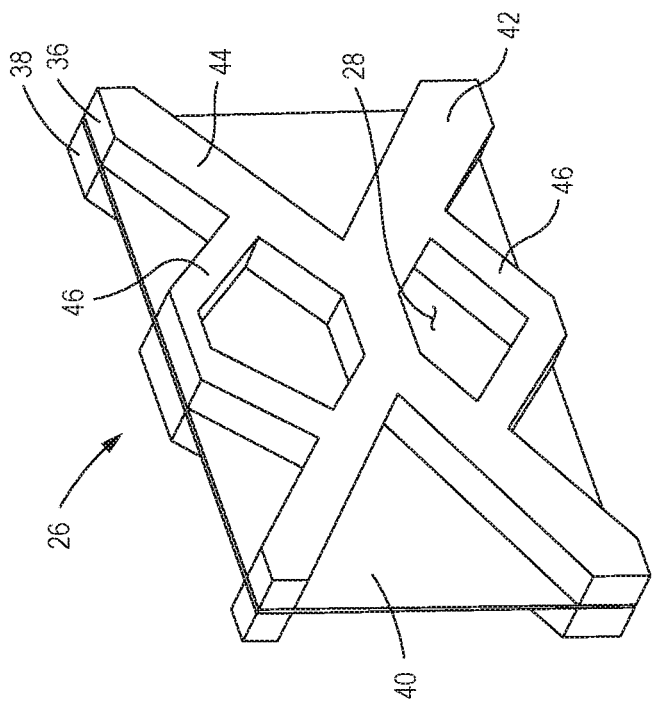
FIG. 7 is a perspective view of a wall similar to FIG. 6, but with the first and second wall members having a microtruss structure, constructed in accordance with the present disclosure.
Figure 8:
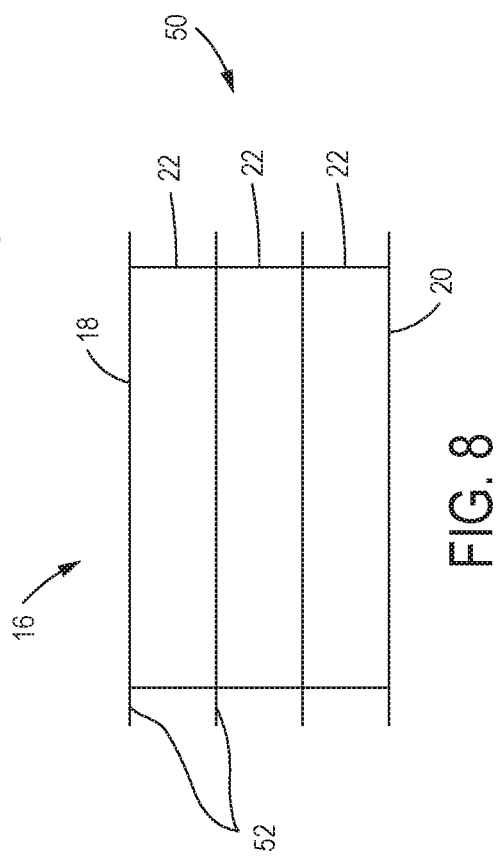
FIG. 8 is a side view of the honeycomb thermal insulation structure having a stack of the honeycomb cores, constructed in accordance with the present disclosure.
Figure 6:
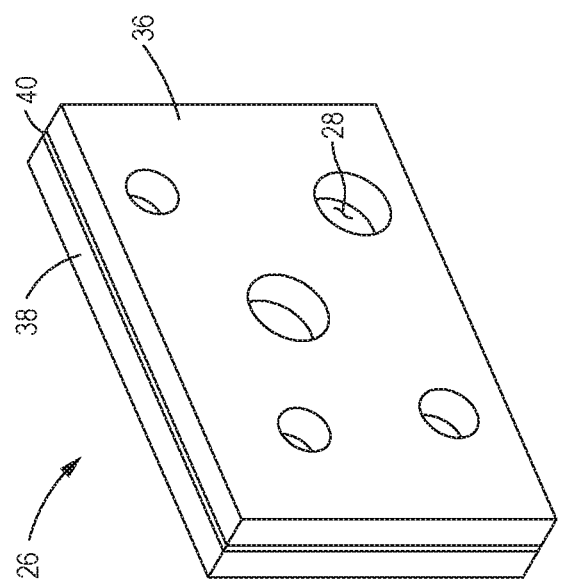
FIG. 6 is a perspective view of a wall similar to FIG. 4, but having a film between first and second perforated wall members, constructed in accordance with the present disclosure.

In an alternative arrangement, each of the walls 26 includes a first wall member 36, a second wall member 38, and a thin film 40 between the first wall member 36 and the second wall member 38 (see FIGS. 6-7). The first wall member 36 and the second wall member 38 each have perforations 28, and the perforations 28 may be complete perforations 30, partial perforations 32, or mixtures thereof. The thin film 40 obstructs or otherwise hinders gas flow through the perforations 28 to neighboring unit cells 24 so as to prevent any pressure changes in one unit cell 24 from influencing convective motion in the neighboring unit cells 24. Consequently, the walls 26 may have more and/or larger perforations 28, allowing for greater weight reduction. The thin film 40 has a thickness ranging between about 5 microns and about 125 microns, and may be formed from polyimide or another suitable material. The thin film 40 is bonded to the first and second wall members 36 and 38, such as with an adhesive.

In yet another alternative arrangement, the first and second wall members 36 and 38 have a microtruss structure with substantially triangular truss support elements 42. For example, the triangular truss support elements 42 may include intersecting crossbars 44 having polygonal support elements 46 near the intersection of the crossbars 44. The first and second wall members 36 and 38 are identical mirror images of each other and symmetrically aligned with respect to each other. However, in other arrangements, the wall members 36 and 38 may be offset with respect to each other, and/or may have different microtruss structures. In any event, due to the inherent mechanical rigidity of the triangular truss support elements 42, a greater amount of material may be removed from the walls 26 to form the perforations 28 while retaining much or all of the mechanical strength of the walls 26. Accordingly, in some embodiments, the walls 26 have a porosity ranging from about 70% to about 90%, allowing for enhanced weight reduction. Moreover, the thermal path for conductive heat flow through the wall 26 of FIG. 7 is longer and has a smaller cross-sectional area than the walls 26 of FIGS. 4-6 to discourage conductive heat transfer.

In another embodiment, the honeycomb thermal insulation structure 16 includes a plurality of the honeycomb cores 22 arranged in a stack 50 with facesheets 52 between the cores 22. The honeycomb cores 22 in the stack 50 may include any of the above-described perforated wall arrangements, or mixtures thereof. Furthermore, the heights (H) of the walls 26 and the distances (D) between the walls 26 of the unit cells 24 may be uniform through the stack 50, or may vary through the stack 50 to accommodate variations in gas properties under different operating conditions. The facesheets 52 are polyimide films, aluminized sheets of polyethylene terephthalate (e.g., Mylar® sheets), other suitable types of facesheets, or mixtures thereof. In one example, the honeycomb cores 22 in the stack 50 are formed from an aerogel each having a height of less than 5 centimeters (cm) (e.g., between about 1 cm and about 3 cm), and the facesheets 52 are polyimide films.

Figure 9:
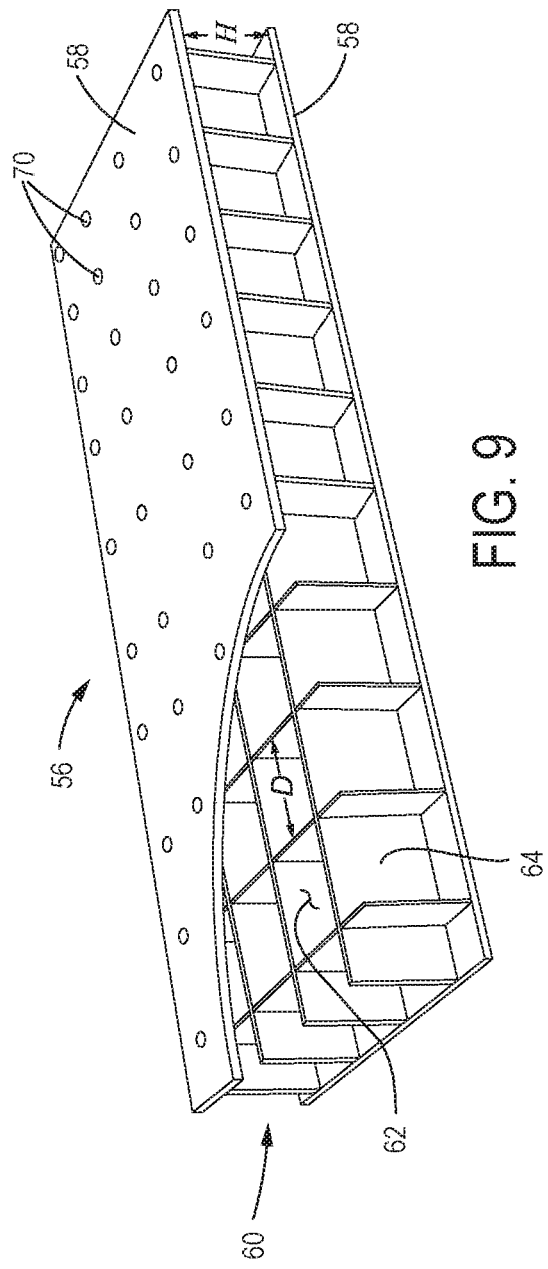
FIG. 9 is a perspective, partially broken away view of another honeycomb thermal insulation structure, constructed in accordance with another aspect of the present disclosure.
Figure 10:
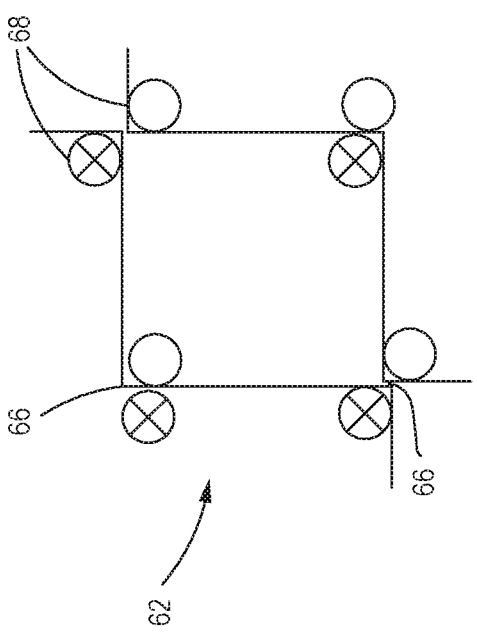
FIG. 10 is a top view of a honeycomb unit cell of the honeycomb thermal insulation structure of FIG. 9, constructed in accordance with the present disclosure.

Another honeycomb thermal insulation structure 56 is shown in FIGS. 9-10. Similar to the honeycomb thermal insulation structure 16 described above, the honeycomb thermal insulation structure 56 includes facesheets 58 and a honeycomb core 60 between the facesheets 58. The honeycomb core 56 includes an array of unit cells 62 formed by walls 64 adjoining at corners 66, and a non-convective gas loaded in the unit cells 62 between the walls 64 to provide the structure 56 with thermal insulation properties. In addition, the height (H) of the walls 64 and the distance (D) between the walls 64 is selected so that there is sufficient friction between the walls 64 and the gas to prevent convective heat transfer through the gas. However, the walls 64 of the honeycomb thermal insulation structure 56 are substantially thinner than the walls 26 of the thermal insulation structure 16 described above. For example, the walls 64 may be formed from a non-perforated or a perforated thin film having a thickness of less than about 30 microns, or less than about 10 microns. In one embodiment, the walls 64 of the honeycomb thermal insulation structure 56 are formed from a polyimide film (e.g., a Kapton® polyimide film) having a thickness of less than 7 microns (e.g., about 6 microns), although other suitable types of thin films may be used in alternative designs. Although the unit cells 62 of the thermal insulation structure 56 are shown as having a rectangular cross-sectional shape in FIGS. 9-10, it will be understood that the unit cells 62 may have other cross-sectional shapes such as, but not limited to, octagonal, heptagonal, hexagonal, pentagonal, or triangular.

Figure 11:
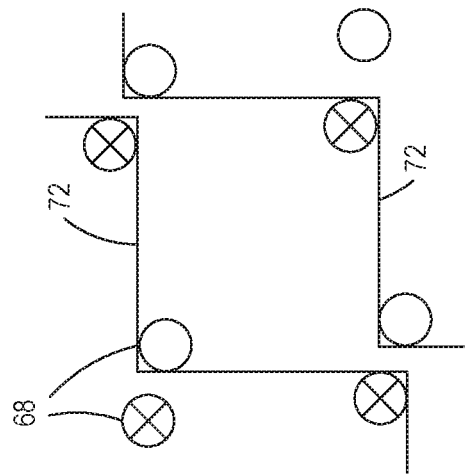
FIG. 11 is a top view similar to FIG. 10, but before sealing the corners of the honeycomb unit cell, constructed in accordance with the present disclosure.

At each of the corners 66 of the unit cells 62 are one or more supporting rods 68 that extend through the height (H) of the honeycomb core 60 and penetrate through the facesheets 58 (see FIG. 10). In one example, the honeycomb core 60 includes a pair of the rods 68 at each of the corners 66, with each rod pair being received in an aperture 70 of each facesheet 58. The facesheets 58 optionally include retaining elements (e.g., bands, wires, washers, etc.) at the apertures 70 that clasp the rods 68 together at the corners 66. In the exemplary rectangular unit cell 62 of FIGS. 9-10, four pairs of the rods 68 form the unit cell 62, with each pair being associated with four of the unit cells 62 except at the boundary of the honeycomb core 60. Prior to fabrication of the honeycomb core 60, the pairs of the rods 68 are spaced apart as shown in FIG. 11 to permit threading of two or more sheets 72 of the thin film therebetween. Specifically, the sheets 72 of the thin film are threaded serpentine between the pairs of the rods 68 to form the walls 64 of the unit cells 62. The rods 68 and the sheets 72 are then clasped together and optionally sealed with an adhesive to close the corners 66 of the unit cells 62 (see FIG. 10). The rods 68 are formed from a material with low thermal conductivity such as, but not limited to, aramid fibers (e.g., Kevlar® rods or tubes), or prepreg tows that are cured after the final assembly of the structure 56.

Figure 13:
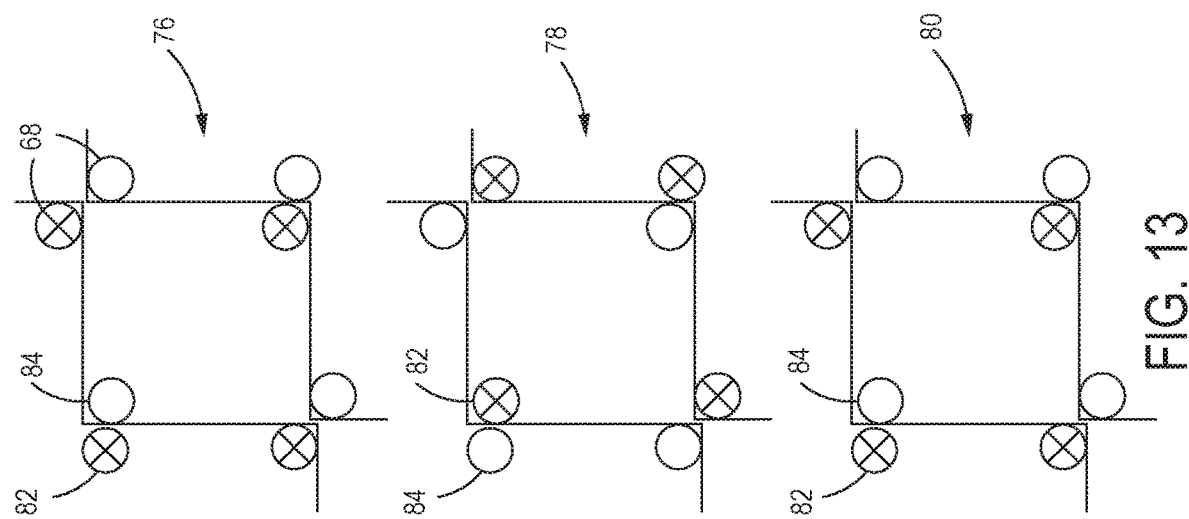
FIG. 13 is a schematic representation of a weaving pattern of rod pairs in the stacked honeycomb cores of FIG. 12, constructed in accordance with the present disclosure.
Figure 12:
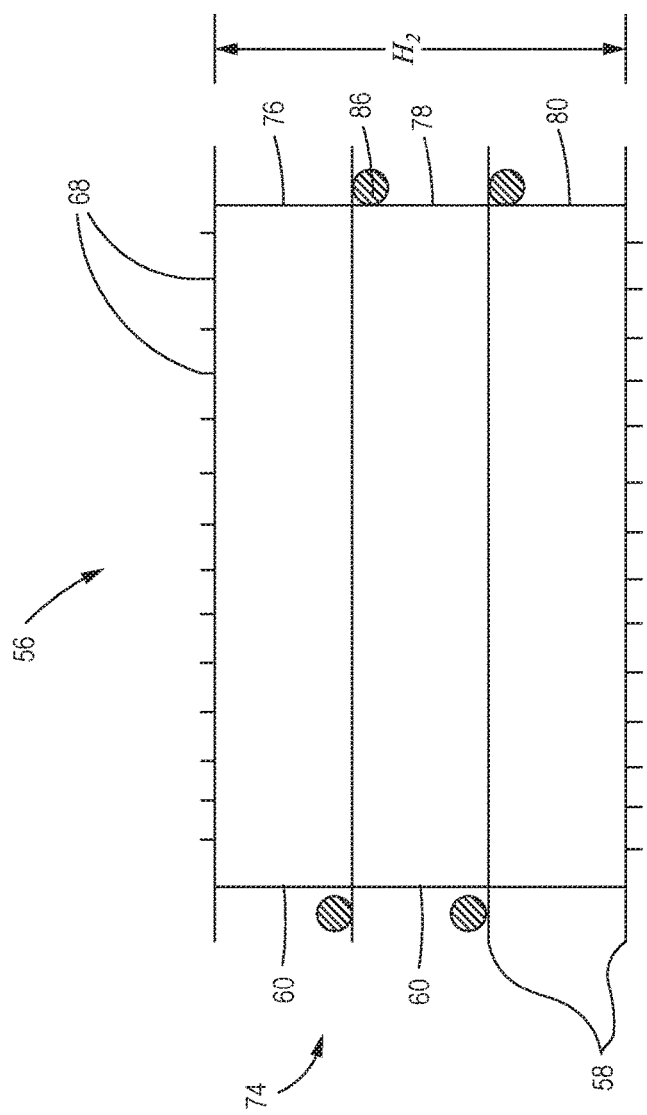
FIG. 12 is a side view of the honeycomb thermal insulation structure of FIG. 9 having a stack of the honeycomb cores, constructed in accordance with the present disclosure.

In some embodiments, the honeycomb thermal insulation structure 56 includes a stack 74 of the honeycomb cores 60 with facesheets 58 between the cores 60, as shown in FIG. 12. The rods 68 extend through a height ($H_2$) of the stack 74 and penetrate through the facesheets 58. The heights (H) of the walls 64 and the distances (D) between the walls 64 in each of the cores 60 may be uniform through the stack 74, or may be varied through the stack 74 to accommodate variances in gas properties under different operating conditions. For example, if the stack 74 includes a top honeycomb core 76, a middle honeycomb core 78, and a bottom honeycomb core 80, each of the honeycomb cores 76, 78, and 80 may have a different wall height (H) and distance (D) between the walls 64. In addition, the rods 68 may extend linearly through height ($H_2$) of the stack 74, or the rods 68 may exhibit a weaving pattern, as depicted in FIG. 13. More specifically, if each pair of the rods 68 includes a first rod 82 and a second rod 84, the first and second rods 82 and 84 alternate positions in each adjacent honeycomb core 60 to provide the weaving pattern. For example, the first and second rods 82 and 84 may switch positions on going from the top honeycomb core 76 to the middle honeycomb core 78, and may switch positions again on going from the middle honeycomb core 78 to the bottom honeycomb core 80 (see FIG. 13). The weaving pattern of the rods 68 discourages heat transfer through the rods 68 by lengthening the thermal flow path along the rods 68.

Referring again to FIG. 12, the facesheets 58 of the stack 74 are formed from a reflective material that exhibits low radiative heat transfer to reduce heat transfer through the stack 74. As one possibility, the facesheets 58 are formed aluminized sheets of polyethylene terephthalate (e.g., Mylar® sheets), although other suitable types of facesheets (e.g., polyimide films, etc.) or mixtures of different types of facesheets may also be used. Optionally, the stack 74 is further supported with wires or rods 86 extending horizontally along the facesheets 58.

Figures 14, 15:
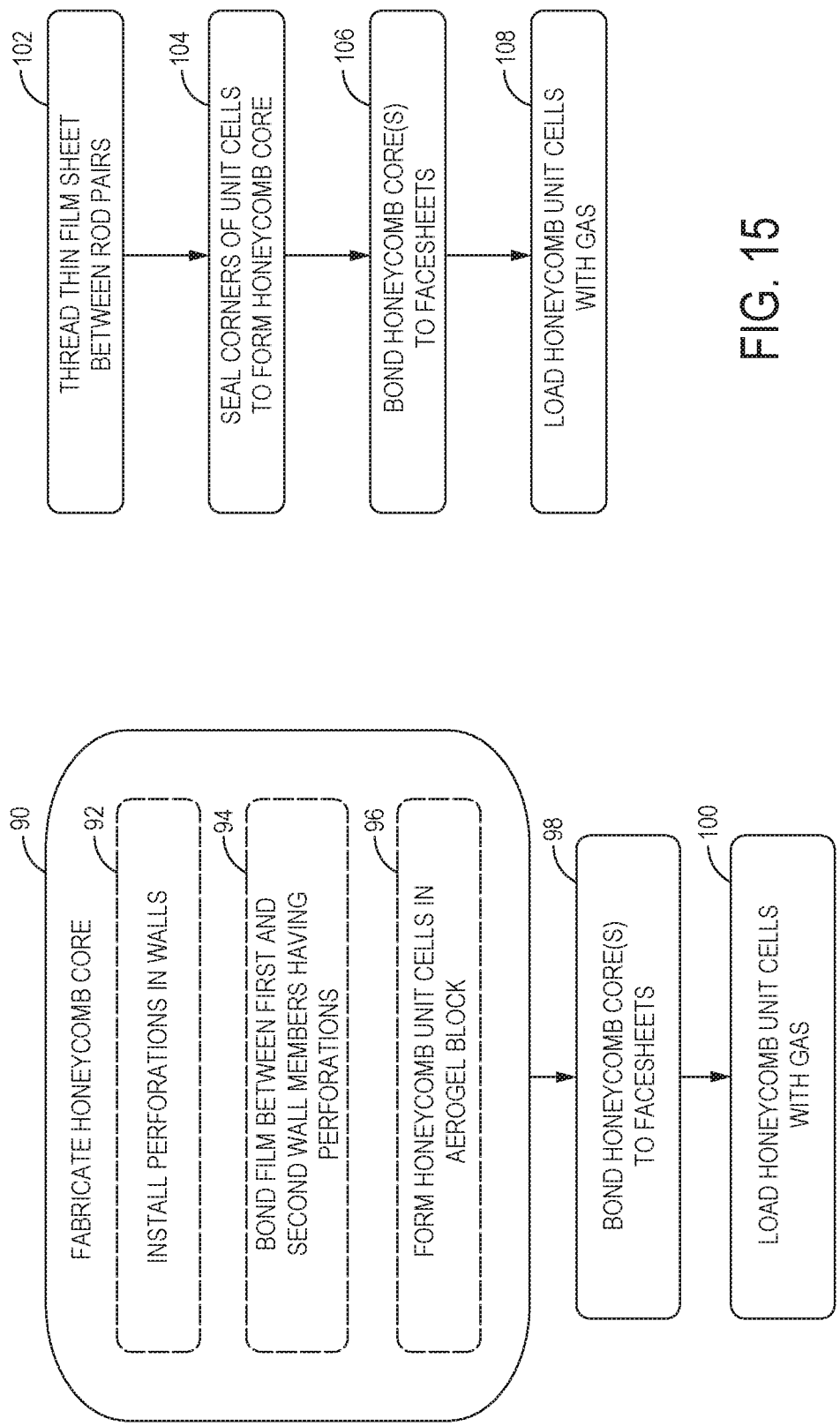
FIG. 14 is a flowchart illustrating a sample series of steps involved in fabricating the honeycomb thermal insulation structure of FIGS. 2-8, in accordance with a method of the present disclosure.
FIG. 15 is a flowchart illustrating a sample series of steps involved in fabricating the honeycomb thermal insulation structure of FIGS. 9-12, in accordance with another method of the present disclosure.

Turning to FIG. 14, a series of steps involved in fabricating the honeycomb thermal insulation structure 16 of FIGS. 2-8 is shown. At a block 90, the honeycomb core 22 is fabricated according to known methods. For example, the block 90 may involve extruding the walls 26 of the honeycomb core 22 from a plastic material to a minimal thickness (e.g., about 100 microns) that can be achieved by the plastic extrusion. The block 90 may further include installing the perforations 28 in the walls 26 to reduce the weight of the honeycomb core 22 (block 92). Installation of the perforations 28 is achieved, for example, by machining, puncturing the walls 26 with a suitable tool (e.g., a needle, a sharpened rod, etc.), forming the perforations 28 with a laser, exposing the walls 26 to ultraviolet (UV) or x-ray radiation, or puncturing the walls 26 with nanorods that are subsequently dissolved or vibrated out of the walls 26. In another arrangement, the honeycomb core 22 is formed using a single film (e.g., about 5-10 microns) or multiple stacked thin films of phase-separated mixtures made using immiscible polymers, with one of the polymers being sacrificially removed by chemically selective dissolution to form the perforations 28 in the walls 26. Alternatively, the honeycomb core 22 with the perforations 28 in the walls 26 is fabricated using three-dimensional (3D) printing. For example, 3D printing may be suitable for fabricating the honeycomb core 22 with walls having the microtruss structure of FIG. 7, and may provide thinner walls (e.g., about 50 microns) than plastic extrusion.

In some embodiments, the block 90 further includes bonding the thin film 40 between the first and second perforated wall members 36 and 38 (block 94) (see FIGS. 6-7). Alternatively, if the honeycomb core 22 is formed from an aerogel, the block 90 includes machining or otherwise forming the honeycomb unit cells 24 with desired dimensions in an aerogel block or blanket (block 96). For instance, if the aerogel block or blanket has a density on the order of about 100 kg/m³, removing about 90% of the aerogel material to form the honeycomb unit cells 24 reduces the density of the aerogel to about 10 kg/m³ for significant weight reduction. In this case, the perforations 28 in the walls 26 of the core 22 are provided by the pre-existing pores of the aerogel.

According to a block 98, the honeycomb core 22 with the perforated walls is then bonded to the facesheets 52. In some embodiments, the block 98 may involve arranging a plurality of the honeycomb cores 22 in a stack 50 and bonding the facesheets 52 between the cores 22 (see FIG. 8). In addition, the gas is loaded into the unit cells 24 according to a block 100. The block 100 involves evacuating air from the unit cells 24 and filling the unit cells 24 with a dry gas such as helium, hydrogen, neon, nitrogen, or argon. Alternatively, if the gas is air, then the block 100 is omitted.

A series of steps involved in fabricating the honeycomb thermal insulation structure 56 of FIGS. 9-12 is shown in FIG. 15. At a block 102, the honeycomb core 60 is formed by threading the thin film sheets 72 between separated pairs of the rods 68 to form the walls 64 of the unit cells 62 (see FIG. 11). During the threading, the sheets 72 and the rods 68 may be held in tension (e.g., using weights, etc.). According to a next block 104, the corners 66 of the unit cells 62 are sealed by clasping the pairs of the rods 68 together (see FIG. 10) such as with a tool and/or with retaining elements (e.g., bands, washers, wires, etc.) in the apertures. Optionally, the block 104 further involves applying an adhesive at the corners 66 to hold the rods 68 and the sheets 72 together. At a block 106, the honeycomb core 60 is bonded to the facesheets 58. In some arrangements, the block 106 further involves stacking a plurality of the honeycomb cores 60 and bonding the facesheets 52 between the cores (see FIG. 12). The gas (e.g., helium, hydrogen, neon, nitrogen, argon, etc.) is then loaded into the unit cells 62 according to a block 108. However, the block 108 is omitted if the gas is air.

INDUSTRIAL APPLICABILITY

In general, it can therefore be seen that the technology disclosed herein has industrial applicability in a variety of settings including, but not limited to, aerospace applications, cryogenic cooling applications, as well as other applications requiring lightweight thermal insulation. For instance, the honeycomb thermal insulation structure disclosed herein is particularly well suited as a thermal insulation structure for applications that experience variable altitudes during operation.

The honeycomb thermal insulation structure disclosed herein includes a non-convective gas loaded in the unit cells of the honeycomb core that serves as the primary insulating element of the structure. Heat transfer by thermal conduction through the honeycomb core is negligible due to the thinness of the honeycomb core walls and the low thermal conductivity of the gas. Notably, the walls of the honeycomb core have partial or complete perforations to significantly reduce the weight of the structure for aerospace applications. The amount of area removed from the walls to form the perforations is chosen so that the friction between the perforated walls and the gas is substantially equivalent to the friction between the gas and identical non-perforated walls. Accordingly, the perforations do not significantly impact the convective behavior of the gas relative to identical but solid walls having a same height and spacing between the walls. Furthermore, the gas flow rate through the perforations to neighboring unit cells is minimal or negligible so that pressure changes in one cell do not influence the convective behavior of the gas in neighboring cells. This feature is particularly beneficial for variable-altitude applications in which the thermal insulation structure is exposed to varying ambient pressures. The perforations also reduce conductive heat transfer through the walls by reducing the number of direct paths for the heat to transfer through the honeycomb walls. In an alternative embodiment, the honeycomb core of the thermal insulation structure is made lighter by fabricating the walls from thin film sheets supported by rods that extend through the height of the structure.

What is claimed is:

1. A honeycomb thermal insulation structure (16), comprising:

a first facesheet (18);

a second facesheet (20);

a honeycomb core (22) between the first facesheet and the second facesheet, the honeycomb core including a plurality of honeycomb unit cells (24) each composed of walls (26) having a height and spaced by a distance, the walls of the honeycomb unit cells having a plurality of perforations (28) that extend from about 70% to about 90% through the thickness of the walls; and a non-convective gas loaded in the honeycomb unit cells between the walls, a flow of the gas through the perforations being substantially absent.

2. The honeycomb thermal insulation structure of claim 1, wherein the walls of the honeycomb core are formed from an aerogel.

3. The honeycomb thermal insulation structure of claim 1, wherein the unit cells have cross-sectional geometrical shape that is one of an octagon, a heptagon, a hexagon, a pentagon, a square, a rhombus, and a triangle.

4. The honeycomb thermal insulation structure of claim 1, wherein the honeycomb thermal insulation structure is configured to insulate a cryogenically cooled component (14).

5. The honeycomb thermal insulation structure of claim 4, wherein the honeycomb thermal insulation structure is disposed in an aerospace vehicle (10).

6. A honeycomb thermal insulation structure (56) for a cryogenically cooled component (14), comprising:

a plurality of facesheets (58);

at least one honeycomb core (60) disposed between the plurality of facesheets, the honeycomb core including a plurality of pairs of rods (68) extending through a height of the honeycomb core and penetrating the facesheets, the honeycomb core further including a plurality of honeycomb unit cells (62) having walls (64) joined at corners (66) and formed by a thin film (72) threaded between the pairs of rods, each of the pairs of rods being located at one of the corners; and a gas loaded in the honeycomb unit cells between the walls, a height of the walls and a distance between the walls of the honeycomb unit cells being selected so that heat transfer through the gas by convection is absent.

7. The honeycomb thermal insulation structure of claim 6, wherein the thin film is composed of a polyimide film having a thickness of less than about 10 microns.

8. The honeycomb thermal insulation structure of claim 7, wherein the honeycomb thermal insulation structure includes a stack (74) of the honeycomb cores with a plurality of facesheets between the honeycomb cores, and wherein each of the honeycomb cores in the stack has a different wall height and a different distance between the walls.

9. The honeycomb thermal insulation structure of claim 8, wherein the pairs of rods extend through a height of the stack, and wherein the pairs of rods exhibit a weaving pattern through the stack such that the rods in each of the pairs of rods alternate positions in each adjacent honeycomb core.

10. A honeycomb thermal insulation structure (16), comprising:

a first facesheet (18);

a second facesheet (20);

a honeycomb core (22) between the first facesheet and the second facesheet, the honeycomb core including a plurality of honeycomb unit cells (24) each composed of walls (26) having a height and spaced by a distance, the walls of the honeycomb unit cells having a plurality of perforations (28), the perforations providing the walls with a porosity; and a non-convective gas loaded in the honeycomb unit cells between the walls, a flow of the gas through the perforations being substantially absent, the height of the walls and the distance between the walls being selected to provide sufficient friction between the walls and the gas so that heat transfer through the gas by convection is substantially absent, the porosity of the walls being selected so that the friction between the gas and the walls is substantially equivalent to a friction between the gas and identical but non-perforated walls having the same height and the same distance between the walls.

11. The honeycomb thermal insulation structure of claim 10, wherein the perforations extend completely through a thickness of the walls.

12. The honeycomb thermal insulation structure of claim 10, wherein the perforations extend partially through a thickness of the walls.

13. The honeycomb thermal insulation structure of claim 12, wherein the perforations extend from about 70% to about 90% through the thickness of the walls.

14. The honeycomb thermal insulation structure of claim 10, wherein the walls of the honeycomb core are formed from an aerogel.

15. The honeycomb thermal insulation structure of claim 10, wherein the unit cells have cross-sectional geometrical shape that is one of an octagon, a heptagon, a hexagon, a pentagon, a square, a rhombus, and a triangle.

16. A honeycomb thermal insulation structure (16), comprising:

a first facesheet (18);

a second facesheet (20);

a honeycomb core (22) between the first facesheet and the second facesheet, the honeycomb core including a plurality of honeycomb unit cells (24) each composed of walls (26) having a height and spaced by a distance, the walls of the honeycomb unit cells having a plurality of perforations (28), each of the walls including a first wall member (36) having perforations, a second wall member (38) having perforations, and a film (40) between the first wall member and the second wall member; and a non-convective gas loaded in the honeycomb unit cells between the walls, a flow of the gas through the perforations being substantially absent.

17. The honeycomb thermal insulation structure of claim 16, wherein the first wall member and the second wall member each include a microtruss structure having substantially triangular truss support elements (42).

18. The honeycomb thermal insulation structure of claim 17, wherein the perforations provide the walls with a porosity, and wherein the porosity of the walls ranges from about 70% to about 90%.

19. The honeycomb thermal insulation structure of claim 16, wherein the unit cells have cross-sectional geometrical shape that is one of an octagon, a heptagon, a hexagon, a pentagon, a square, a rhombus, and a triangle.

20. The honeycomb thermal insulation structure of claim 16, wherein the honeycomb thermal insulation structure is configured to insulate a cryogenically cooled component (14).

* * * * *